US011243329B2

(12) United States Patent
Del Grande (10) Patent No.: US 11,243,329 B2
(45) Date of Patent: Feb. 8, 2022

(54) DETECTING SUBSURFACE OBJECTS AND VOIDS USING THERMAL INERTIA

(71) Applicant: Nancy Kerr Del Grande, Newark, CA (US)

(72) Inventor: Nancy Kerr Del Grande, Newark, CA (US)

(*) Notice: Subject to any disclaimer, the term of this patent is extended or adjusted under 35 U.S.C. 154(b) by 47 days.

(21) Appl. No.: 16/799,084

(22) Filed: Feb. 24, 2020

(65) Prior Publication Data
US 2020/0278472 A1  Sep. 3, 2020

Related U.S. Application Data

(60) Provisional application No. 62/923,801, filed on Oct. 21, 2019, provisional application No. 62/812,318, filed on Mar. 1, 2019.

(51) Int. Cl.
*G01V 9/00* (2006.01)
(52) U.S. Cl.
CPC .................... *G01V 9/005* (2013.01)
(58) Field of Classification Search
CPC ....................................... G01V 9/005
See application file for complete search history.

(56) References Cited

U.S. PATENT DOCUMENTS

| 4,005,289 A | 1/1977 | Del Grande |
| 4,257,106 A | 3/1981 | Auer |
| 5,444,241 A | 8/1995 | Del Grande et al. |
| 5,718,511 A | 2/1998 | Mundt |
| 6,841,781 B2 | 1/2005 | Toomey |
| 7,157,714 B2 | 1/2007 | Del Grande |
| 8,494,220 B2 | 7/2013 | Del Grande |
| 8,787,619 B2 | 7/2014 | Del Grande |
| 9,080,917 B2 * | 7/2015 | Nguyen ............. E21B 47/135 |
| 9,322,917 B2 | 4/2016 | Mohamadi |

(Continued)

FOREIGN PATENT DOCUMENTS

| CN | 104459814 A | 3/2015 |
| CN | 105528586 B | 4/2017 |

OTHER PUBLICATIONS

Del Grande et al., "Dual-band infrared capabilities for imaging buried object sites", Lawrence Livermore National Laboratory, Livermore, California, SPIE vol. 1942, pp. 166-177, 1993.

(Continued)

*Primary Examiner* — Nathaniel T Woodward
*Assistant Examiner* — Philip L Cotey
(74) *Attorney, Agent, or Firm* — Lerner, David, Littenberg, Krumholz & Mentlik, LLP (57) ABSTRACT

A method for gathering reference data for use in planning and interpreting infrared surveys for the purpose of detecting and locating underground features, such as tunnels, voids, or manmade devices. Measurements, images, or observations at a site having known underground features are recorded. Recorded details include a combination temperatures at or near a soil surface at multiple points across the site in addition to above surface factors such as shading, weather conditions, and objects or foliage. Analysis of the details recorded from the site having known underground features yields quantitative estimates of the effects of various above and below surface factors on temperatures at or near the soil surface.

19 Claims, 5 Drawing Sheets

(56) References Cited

U.S. PATENT DOCUMENTS

| | | | |
|---|---|---|---|
| 9,508,124 | B2 | 11/2016 | Bailey et al. |
| 9,741,120 | B2 | 8/2017 | Zhang et al. |
| 10,262,540 | B2 | 4/2019 | Banvait et al. |
| 10,313,575 | B1 | 6/2019 | Wingo et al. |
| 10,380,729 | B2 | 8/2019 | Hovland et al. |
| 2004/0183020 | A1* | 9/2004 | Del Grande .......... G01J 5/0003<br>250/341.6 |
| 2010/0091611 | A1 | 4/2010 | Laake |
| 2010/0171518 | A1* | 7/2010 | Bateman ................ G01N 25/18<br>324/724 |
| 2012/0134533 | A1* | 5/2012 | Del Grande ......... G06K 9/0063<br>382/103 |
| 2013/0322693 | A1* | 12/2013 | Del Grande ......... G06K 9/0063<br>382/103 |
| 2015/0233773 | A1* | 8/2015 | Sale ....................... G01K 1/026<br>374/29 |
| 2016/0371841 | A1* | 12/2016 | Zhang ................... G01V 9/005 |
| 2017/0122833 | A1* | 5/2017 | Furry ..................... G01J 5/061 |
| 2018/0239055 | A1* | 8/2018 | Widmer ................ B60L 53/124 |
| 2019/0014272 | A1 | 1/2019 | Hutchison et al. |
| 2020/0141816 | A1* | 5/2020 | Sanger ................... G01K 17/08 |

OTHER PUBLICATIONS

Del Grande, N. Kerr, "Thermal inertia contrast detection of sub-surface structures", Proc. of SPIE vol. 7299 72990D-1, doi: 10.1117/12.829407, ©0 2009.

Del Grande, Nancy, "Airborne Detection of Buried Minefields", Energy and Technology Review Dec. 1991, UCRL-52-000-91-12,9, pp. 9-21.

\* cited by examiner

DETECTING SUBSURFACE OBJECTS AND VOIDS USING THERMAL INERTIA

CROSS-REFERENCE TO RELATED APPLICATIONS

The present application claims the benefit of the filing dates of U.S. Provisional Patent Application Nos. 62/923,801, filed Oct. 21, 2019, entitled "Phase 1-Unearthing Underground Tunnels Report," and 62/812,318, filed Mar. 1, 2019, entitled "Tunnel Void Imager For Detecting Subsurface Tunnel Voids," the disclosures of which are hereby incorporated herein by reference.

BACKGROUND

The temperature of the earth's surface is impacted by the many processes that control the net flow of energy into and out of its surface. The largest contribution is the direct heating by the sun. The surface can also be heated or cooled by conduction (flow of energy from warmer areas to cooler areas), convection (flow of energy due to movement of air/water above the surface) and evaporative cooling (flow of energy due to evaporation of water at the surface). Each process has its own level of impact and timescale on which it is relevant.

The diurnal cycle is a primary driver (directly and indirectly) of the temperature of the surface. When light from the sun falls on the earth's surface the absorbed energy (the percentage of which is the surface albedo) will increase the temperature of that surface. When the temperature at the surface is higher than that below that surface, energy will be conducted downward. The amount of energy that the subsurface can absorb and the speed at which it can absorb it goes a long way toward determining the surface temperature.

A column of solid earth material above and including a hollow or semi-empty underground object has less thermal inertia (resistance to temperature change) than an adjacent, equal-volume column of solid earth material without the hollow object. Typical subsurface objects displace the host materials which surround them. A column of earth material above hollow, or partially-empty objects undergoes larger diurnal or seasonal temperature changes, has warmer than ambient surface temperatures at midday, or during autumn, and has cooler than ambient temperatures at predawn, or during spring. This applies to, e.g., subsurface explosive devices, tunnels, caves, drains, tombs, pipelines, channels, cisterns, sewers, vessels, bunkers, trailers, and other such structures and sites, as well as surface and buried structures having flaws such as cracks and areas of corrosion.

Scientists have routinely used long wavelength IR bands at 8-12 microns or medium wavelength IR bands at 3-5 microns for thermal imaging in limited applications. The single IR band apparent thermal image has a non-thermal spectral reflectance component which is useful, for example, rock type mapping, mineral recognition, or monitoring distressed crops. However, the conventional single band thermal imaging is difficult to interpret. It yields imprecise information that is insensitive to the subtle heat flow anomalies produced by subsurface flaws and foreign objects. These conventional single band imaging techniques fail to distinguish between surface emissivity clutter and true temperatures. In addition, emissivity-related noise, typically 1 or 2 degree ° C., cannot be removed using a single passive thermal IR band image even when used in conjunction with another active laser reflectance IR band.

The more recent technique of Dual Band Infrared (DBIR) Imaging has numerous advantages over the conventional thermal imaging which utilizes only a single IR band. DBIR imaging has been used to detect buried land mines by exploiting temperature differences between the mine site and the surrounding soil. U.S. Pat. No. 4,005,289 describes this method, the disclosure of which is incorporated herein by reference. See also N. K. Del Grande, et al., "Buried Object Remote Detection Technology For Law Enforcement, in Surveillance Technologies, SPIE 1479, p. 335, 1991," which notes the difficulty of removing clutter from corrected temperature maps lacking thermal inertia diagnostics; N. K. Del Grande, P. F. Durbin, M. R. Gorvad, D. E. Perkins, G. A. Clark, J. E. Hernandez and R. J. Sherwood, "Dual-band Infrared Capabilities for Imaging Buried Object Sites", in Proc. of SPIE Conference 1942; and Underground and Obscured Object Imaging and Detection, Ed. N. Del Grande, I. Cindrich and P. Johnson, Orlando Fla., pp. 166-177, Apr. 15-16, 1993, the disclosures of which are incorporated herein by reference.

The DBIR imaging technique reduces false detections produced by clutter. It decouples the heat patterns (associated with underground hollow or semi-empty tunnel sites) from the surface emissivity patterns (associated with clutter). Clutter typically produces 1 or 2° C. apparent temperature-difference patterns. Most sites with clutter cannot be distinguished from subsurface explosive devices or underground tunnels and caves using a single passive thermal IR band. The DBIR technique uses two passive thermal IR bands to separate the image's thermal components from its emissivity components.

The DBIR approach clarifies thermal emission imagery by combining images from filtered medium wavelength 3-5 micron (MWIR) (e.g., 4.3-5.1 microns) and filtered long wavelength 8-12 micron (LWIR) (e.g., 9.6-11.6 microns) focal plane arrays. It senses temporal heat flows from variable-depth objects and voids such as cracks (contained air gaps or corrosion). It does this at least two times during the diurnal or annual cycle, when solar-heated hollow or semi-empty objects produce above ambient or below ambient temporal thermal and thermal inertia signatures unlike those of foreign-object clutter or those of the undisturbed host materials.

The DBIR images have similar thermal emission patterns but different spectral reflectance patterns. This approach, unlike the long wavelength infrared or medium wavelength infrared single-band approach, allows the user to identify weak heat flows from underground objects such as subsurface explosive devices (SSEDs) or deep underground tunnels (UGTs) and caves apart from natural terrain and foreign object clutter.

Thermal inertia diagnostics have also been used in conjunction with DBIR imaging to map flaws in heated structures (delamination gaps in bridge decks and corrosion gaps in aircraft) by exploiting thermal differences between the flaw and the structural material. U.S. Pat. No. 5,444,241, incorporated herein by reference, describes this method.

The most recent technique is the Dual Infra-Red Effusivity Computed Tomography method: (DIRECT). This method adapts DBIR imaging of emissivity corrected temperatures for locating SSEDs and UGTs as described in U.S. Pat. No. 7,157,714, the disclosure of which is incorporated herein by reference. Surface heat flow signatures occur periodically during the day and night, for objects (e.g., land mines) less than 1 meter deep, and annually during diverse seasons, for hollow or semi-empty objects (e.g., drainage channels) more than 1 meter deep. See N. K. Del Grande, "Thermal inertia contrast detection of subsurface structures", Proc. of the SPIE Conference, Thermosense XXXI, Vol. 7299, pp. 166-178, Orlando, Fla., United States, 14-15 Apr. 2009, the disclosure of which is incorporated herein by reference.

The DIRECT approach discussed in U.S. Pat. No. 7,157,714 uses a temperature simulation model (e.g., an Annual Surface Climate Energy Budget, ASCEB, Model) to locate temporal heat flows from underground objects at times commensurate with their depth, density, volume, material and effusivity compared to that of the ambient host materials. The ASCEB model inputs over a dozen environmental parameters to determine suitable thermal survey times and conditions for simulating soil temperatures and temperature spreads which will detect, locate and characterize the subsurface object or structure.

Optimum times for thermal imaging surveys depend on the object depth, dimensions, material, and contrasting host material properties. In most cases, some of these characteristics will be unknown initially. Initial estimates used to establish thermal survey dates and times are based on the daily (or annual) air temperature response and the undisturbed terrain temporal thermal properties. This provides input to a daily (or annual) surface temperature simulation model. The model simulates the surface temperature response times which enhance detection of underground objects from an airborne platform.

The DIRECT procedure records air and surface material (such as soil, roadway or water) temperature highs, lows, and high minus low temperature differences. The method highlights thermal and thermal inertia contrast at the borders of variable-depth objects having physical, thermal and temporal properties which differ from natural terrain. It designates suitable survey times based on the model to locate objects with variable depths, dimensions and host material properties. It collects thermal data at an alternative site with similar surface cover and host materials at times which provide optimum thermal and thermal inertia contrast.

BRIEF SUMMARY OF THE DISCLOSURE

The naturally heated sites of typical buried objects embedded in solid host materials have surface thermal signatures which occur before the sites of ambient host materials heat up (or cool down). They heat up or cool down faster and sooner than their surroundings. They have less thermal inertia per unit volume, and larger high minus low daily temperature spreads, than the denser undisturbed terrain. Their surface temperature highs and lows occur after the air temperature highs and lows and before the highs and lows of the ambient terrain.

Conversely, the naturally-heated sites of solid objects enclosed in hollow or semi-empty containers have more thermal inertia per unit volume, smaller high minus low daily temperature spreads, and take longer to heat up (or cool down) than their less dense surroundings. Their surface temperature highs and lows occur after the air temperature highs and lows and after the highs and lows of their hollow or semi-empty containers.

Incorporating temporal thermal imaging using dual band infrared (DBIR) wavelengths enables locating underground objects such as subsurface explosive devices, underground tunnels and caves, and other subsurface structures and sites such as underground pipes or other objects. Likewise, normal and corroded structures such as bridge decks heat and cool at different rates depending on their thermal inertias. Infrared surveys can therefore be used to detect corrosion cracks, material loss gaps and delaminations in faulty structures such as pipes and bridge decks. Such surveys are useful to locate and quantify the size and extent of the damage in faulty structures such as aged and weathered transportation structures (e.g. bridges, highways, landing strips, transmission pipelines, train superstructures and aircraft). For example, the temporal thermal survey maps of bridge decks provide a 3-D visual display of interior deck delaminations formed from corrosion cracks, gaps and material losses in the concrete. Each of the above individually and collectively being referred to hereinafter as an artifact.

Planck's law states that radiation emitted by a source can be related to its temperature. Based on a binomial expansion of Planck's law for temperatures near room temperature, the expansion of Planck's law states that the radiant emittance of a surface is proportional to emissivity times absolute temperature to the power of (50/wavelength in microns).

A power law thermal model provides the physical rationale for taking signal ratios of narrow IR bands based on equations derived from a binomial expansion of Planck's law. These signal ratios are insensitive to the natural surface emissivity and provide emissivity-corrected thermal responses. The derivation of this model is given in the Appendix of LeSchack and Del Grande, "A Dual-Wavelength Thermal Infrared Scanner as a Potential Airborne Geophysical Exploration Tool," Geophysics, VOL. 41, No 6 (December 1976) P. 1318-1336, incorporated herein by reference. This model may be used to determine signal ratios that are in turn used to remove surface emissivity noise.

The emissivity of surface materials is highly variable from one land area to another. However the ratio of signals at two or more wavelengths can be used to obtain highly precise surface-temperature measurements that depend very little upon emissivity variations. For example, temperature differences as small as 0.2 degrees ° C. can be obtained by using the DIRECT method.

At wavelengths where the radiation has the same spectral slope as a blackbody source, i.e., an object that absorbs all radiation, the emissivity ratio variations are very small. Thus, quantitative temperature measurements may be made using signal ratios that are calibrated against a standard blackbody source.

A typical grey-body surface is an object that absorbs about 95-99% of all radiation and thus has an emissivity of less than 1. If a structure is a grey body, its respective temperatures will look alike at wavelengths of 5 micrometers and 10 micrometers.

Where the surveyed structure behaves in true grey-body fashion, no matter what area is scanned, the ratio of emissivity at one wavelength divided by the emissivity at a second wavelength $\epsilon\lambda_1/\epsilon\lambda_2$ is constant. The ratio of two signals at differing wavelengths can then be calibrated and the blackbody temperature obtained. The wavelengths may be, for example, $\lambda_1=5$ μm and $\lambda_2=10$ μm, respectively, because these are the common wavelengths that are recorded by present-day scanners.

Because the heat flow anomaly is difficult to accurately measure, corrections may be made to accurately associate the thermal anomaly with a subsurface object. Furthermore, measured surface temperatures can be inaccurate because of an emissivity factor (noise) generated by clutter. Clutter may include, e.g., shadows, clouds, tracks, stains, disturbed terrain, holes, vegetation, foreign objects, foreign materials, foreign soils, water, cool air pools and roughness variations, particularly average spacing between bushes.

Cumulative extraneous effects (e.g., noise produced by clutter) that can mask temperature anomalies are often an order of magnitude greater than the desired anomalous component. Appropriate corrections are therefore preferably made to facilitate interpretation. Clutter of a specular nature may be identified and removed by image processing because it has a distinctive emissivity signature. The emissivity factor produced by reflected-infrared signal noise, relates to the ability of surfaces which produce clutter to emit radiant energy less than that of a black body at the same temperature and differently at one wavelength than at another. A black body is an ideal surface that absorbs and emits all radiation without reflection.

Features of the DIRECT temporal thermal approach as generally laid out in U.S. Pat. No. 8,787,619, which is hereby incorporated by reference in its entirety, are its use of precisely measured, curve-fitted field data for:

(1) Optimizing thermal survey times to enhance detection of object sites.

(2) Providing database input to account for object site temporal heat flows.

(3) Recognizing object sites amidst decoys, foreign objects and natural terrain.

This approach uses dual-band IR images to remove non-thermal clutter. It schedules dual survey times to distinguish unique SSED site signatures from those of decoys, foreign objects or host materials. This simplifies clutter removal and clarifies target recognition.

Advantages of thermal inertia contrast detection compared to other approaches are, it:

(1) enhances surface temperature differences versus time to locate tunnels or object-voids at depth;

(2) maps heat flows from naturally-heated voids at depths 2-20 times their heights;

(3) detects substructure voids at standoff distances from 10 to 10,000 feet above ground;

(4) removes clutter from foreign objects and non-thermal (reflected or absorbed) signals;

(5) views the location and orientation of subterranean tunnels and passageways; and (6) displays the depth, height and volume of underground voids in 3-D.

(7) Distinguishes safe from hazardous locations which may contain explosive devices or support "at risk" structures e.g., corroded bridge decks or natural gas transmission lines.

An alternative approach to using an Annual Surface Climate Energy Budget (ASCEB) model described in U.S. Pat. No. 7,157,714 is to map air and host material temporal thermal changes which distinguish object sites from normal, undisturbed host material sites. Realistic input parameters are provided using the DIRECT method as an empirical approach to locate and characterize the depth and dimensions of object sites. This is used to enhance detection of thermal inertia outliers at the borders of object sites.

An automated airborne temporal thermal survey method, applicable to any area of the world, may be used to detect the presence of buried objects and indicate general information about the size, type and depth of the object. The approach takes advantage of heating and cooling rate differences between background materials and the location that contains buried objects. The method uses dual (mid-wave IR and long-wave IR) thermal imagery and a modeling approach to determine the highest probability of detecting objects of a particular size and at a particular depth. The approach highlights thermal contrast at the locations of buried objects. It uses dual bands to provide the ability to determine temperature and emissivity independently, effectively removing background clutter.

To model the daily natural or manmade surface temporal thermal behavior, such as the surface temperature versus time responses to different weather conditions requires:

(1) Measuring precise near-surface temperatures of the air and surface-material at 10 minute intervals for several days under different weather conditions, (2) Curve-fitting the air and near-surface roadway material data taken, with and without a buried surrogate object, at times when shallow temperature gradients and heat flows change rapidly at the surface, and (3) Scheduling thermal survey times to correspond with time periods which have optimum thermal contrast at object sites during the day and night for different materials and weather conditions.

A process for detecting subsurface anomalies includes selecting times when the temperature spreads suffice to detect, locate and characterize the subsurface objects amidst foreign-object clutter and undisturbed background terrain. The data base tabulates time periods when surface temporal heat flows from buried object sites enhance surface temperature contrast, and daily 0 to 1 m or 2 m depth temperature-spread differences ≥0.5° C. relative to background temperature spread differences for measured overburden materials and depths.

The temporal response routine fits actual data recorded during clear, calm, dry weather (or light clouds, mild wind speeds and scattered showers) when unmanned aerial vehicle (UAV) thermal imagery would be most (or barely) effective. Curve fits will smooth, merge, and characterize data taken during four periods: near sunrise when shallow surface materials are warming, midday when there is little change, late afternoon when shallow surface materials cool at the fastest rate and late evening when shallow surface materials cool at a slower rate.

The de-clutter routine co-registers dual band IR thermal images and masks areas which have "apparent thermal" differences using MWIR and LWIR thermal imagery. It provides corrected temperature maps, and emissivity (spectral-difference) maps.

The feature recognition routine combines the co-registered, corrected temperature images taken at two times when the host material (displaced or not displaced by an embedded object) has the largest temperature contrast at the site of an object. These times are determined using look-up tables in the data base. The data base is composed of the results of curve-fitted field data taken using surrogate object materials surrounded by typical host materials.

An important step in detection of subsurface voids in a given region is creation of a database for selecting appropriate survey times and for reference during analysis of survey results. For example, a site within the region and having known subsurface features may be monitored over a period of time. A combination of temperature, infrared, weather, lighting, and/or other data taken from the site as a whole or from specific locations and elevations throughout the site may be compiled in a database for the above stated purposes. In a more specific example, an array of thermal probes may be distributed in a spaced arrangement above and below the soil surface across a site, and temperature measurements over time from the probes may be compiled with contemporaneous weather data from an on-site weather station and images or visual observations of the site.

A database compiled according to any of the above examples may be analyzed in consideration of known subsurface features of the site to yield information that may be useful in determining optimal times for surveys within the region for interpreting such survey results. Temperature measurements over time from the thermal probes may be compared in view of factors affecting each individually, such as the subsurface features, shade, and sources of clutter affecting each probe's temperature. The temperature measurements and the results of the comparisons may further be considered in view of factors such as weather data that affect the entire site. Such analyses may enable quantification of the impact of various factors on temperature and infrared measurements.

For example, the above described analyses may enable the effect of shade on temperature or infrared measurements to be estimated for typical conditions within the region during certain times of year, times of day, or types of weather. Such estimates enable accounting for the effects of shade when interpreting survey data. Further, the above described analyses may identify weather conditions that would render a survey during an otherwise optimal time of year and time of day unproductive. For example, it may be determined that a certain wind speed over a period of time on a given day would affect soil temperature responses within the region such that subsurface anomalies below a certain depth could not be detected from survey data gathered within the region on that day.

According to an aspect, a method of compiling a database of local soil conditions may include recording measurements of temperature from thermal probes distributed near a soil surface across a first site, the first site having known subsurface features. The measurements may be recorded at regular intervals of less than ten minutes throughout a monitoring period. The method may further include correlating patterns in the recorded temperature measurements over time at particular soil surface locations within the first site with the subsurface features below the particular soil surface locations.

In some arrangements, the method may include recording measurements of lighting and weather conditions occurring at the first site during the monitoring period. The method may further include quantitatively estimating effects of the lighting and weather conditions on temperatures of the soil surface at the particular soil surface locations.

In some arrangements, the method may include estimating effects of above surface features of the first site on temperatures of the soil surface at the particular soil surface locations by comparison of temperatures measured at particular soil surface locations having varying proximity to the above surface features.

In some arrangements, at least one of the above surface features may be a shadow.

In some arrangements, the correlating step may include identification of temperature change over time signatures created by the known subsurface features at the soil surface.

In some arrangements, the method may further include identification of weather conditions that render the temperature change over time signatures of known subsurface features having certain characteristics undetectable at the soil surface.

In some arrangements, the certain characteristics may include depth below a threshold.

In some arrangements, one of the unfavorable above surface conditions may be a measured wind gust above a threshold occurring between a first time of day and a second time of day In another aspect, a method of detecting features below a soil surface of a survey site may include interpreting survey data of the survey site with reference to a database. The survey data may be derived from an infrared survey including a first pass and a second pass. The second pass may be conducted at a later time than the first pass. The database may include measurements of temperature from thermal probes distributed near a soil surface across a surrogate site. The surrogate site may have known subsurface features. The measurements of temperature may be recorded at regular intervals of less than ten minutes. The reference to the database may include comparison of the survey data to correlations between temperature changes over time at the particular soil locations within the surrogate site and the known subsurface features of the surrogate site.

In some arrangements, the first pass and the second pass may be scheduled by selecting a target depth, and consulting the database to determine times of year and times of day wherein a known subsurface feature of the surrogate site at the target depth creates detectable signatures in temperature change over time at the surrogate site.

In some arrangements, the database may include estimates of effects of at least one type of above surface feature on temperatures measured at the soil surface of the surrogate site. The interpreting step may include accounting for effects of an above surface features of the same type at the survey site by reference to the estimates.

In some arrangements, the type of above surface feature at the surrogate and survey site may be shade.

In some arrangements, the estimates may be derived by comparison of temperatures at particular soil locations at the survey site having varying proximity to the above surface feature at the surrogate site.

In some arrangements, the infrared survey may include use of a first infrared camera and a second infrared camera, the first infrared camera configured for shorter wavelengths than the second infrared camera.

In some arrangements, the infrared survey may include use of one or more cold filtered infrared cameras.

DETAILED DESCRIPTION

Figure 1:
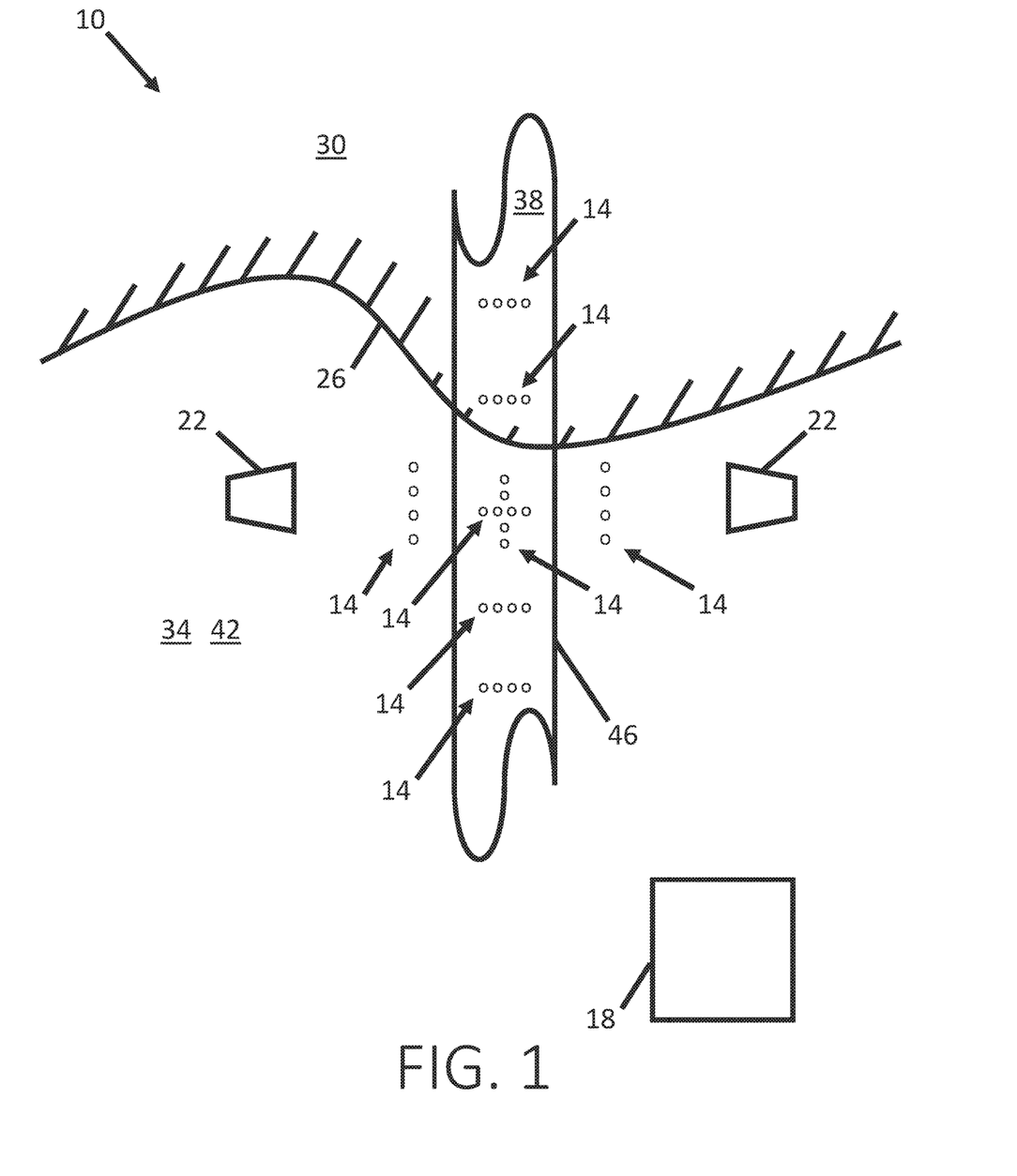
FIG. 1 is a schematic plan view of an arrangement of measuring devices at a surrogate site according to an arrangement of the present disclosure.

As shown in FIG. 1, a surrogate site 10 is populated with an array of thermal probe groups 14 arranged at, near, and/or slightly above or below a soil surface of the surrogate site, a weather station 18, and cameras 22. Though not illustrated, foliage, rocks, debris, height variations, and other surface variations are also distributed across the surrogate site 10. Generally, more sensitive and accurate thermal probes provide more useful information. In some examples, the thermal probes used in the probe groups 14 are accurate to two tenths of a degree Centigrade or better. In further examples, the thermal probes used in the probe groups 14 are accurate to one tenth of a degree Centigrade or better. Environmental factors and sources of clutter can reduce the effective accuracy of thermal probes used in the field, so thermal probes may be chosen to be more precise or accurate than necessary for the desired data to be gathered. For example, where data accurate to within two tenths of a degree Centigrade is desired, thermal probes accurate to within one tenth of a degree Centigrade may be used to compensate for environmental factors and clutter. The weather station 18 has apparatus for measuring various weather conditions, such as wind speeds, ambient air temperature, cloud cover, and/or any other measurable weather conditions. The cameras 22 are oriented toward the probe groups 14 so as to enable observation and recording of visible conditions affecting the probe groups 14. In the illustrated example, the cameras 22 are on opposite sides of the surrogate side and oriented to face each other. The cameras are spaced apart by a suitable distance to put all probe groups 14 within the field of view of both cameras, such as between 10 and 20 meters, or 15 meters. Further, a single camera 22 or a greater number of cameras 22 may be used. Though not shown in FIG. 1, an infrared camera may also be placed at the surrogate site 10 for use in cooperation with the probe groups 14, weather station 18, and cameras 22.

Measurements taken by the probe groups 14, weather station 18, and cameras 22 are recorded continuously or at regular intervals over a given period of time. In one example, temperature measurements by the probe groups 14 are taken every five minutes, or at any regular interval below 10 minutes within an observation period. In various further arrangements, the regular interval is 8 minutes, 6 minutes, 4 minutes, less than 8 minutes, less than 6 minutes, less than 5 minutes, less than 4 minutes, or approximately 8, 6, 5, or 4 minutes. The observation period is a given time of day, such as from noon to 5 PM, or an entire 24 hour period, and is limited to a single day, or extends across multiple days that may or may not be consecutive. Typically, temperature contrasts and differences in thermal inertia between various above and below surface features are greatest in the spring and fall of a given year. Optimum dates for detecting deep below surface features are therefore in the spring or fall in most regions. Measurements from the weather station 18 and images or video from the cameras 22 are recorded on the same interval as the measurements from the probe group 14 or on a different interval. In some examples, average or maximum wind speed, or wind gusts, meaning sudden changes in wind velocity, measured by the weather station 18 are recorded for every three hour period within the observation period. Use of thermal probes at the surrogate site 10 enables recordation of accurate temperature measurements. Particularly, thermal probes will not measure infrared clutter that would be indistinguishable from temperature variations from an infrared survey alone, such as clutter resulting from reflected earth or sky spectral radiance, bodies of water, restrahlung rays, vegetation, pockets of hot or cool air, or reflective above ground objects.

An exemplary visible condition detectable by the cameras 22 is a shade line 26, which separates a shaded area 30 from an unshaded area 34. Video or sequential images recorded by the cameras 22 therefore shows which probe groups 14 are in the shaded area 30 or unshaded area 34 throughout an observation period and a particular times of day. The cameras 22 also enable observation of above surface features near each probe group 14. Above surface features such as rocks, foliage, and debris are observed such that their influence on temperature measurements taken by the probe groups 14 can be accounted for.

The probe groups 14 are distributed near the surrogate site's 10 soil surface to measure near-surface conditions so that near-surface conditions typical of known subsurface features at the surrogate site 10 can be observed. In the illustrated example, the known subsurface features of the surrogate site 10 include solid ground and an anomaly. Solid ground here means a vertical column of earth having a typical composition for the region and free of significant natural or manmade irregularities at least to a measurable depth. The measurable depth is a function of the temperature measurement equipment available, and in some examples is 15 meters, 20 meters, or greater than 20 meters. Exemplary subsurface anomalies include a portion of loosened or disturbed soil, or a void such as a cavern or manmade tunnel. An anomalous area 38 of soil surface at the surrogate site is above a subsurface anomaly, and a solid ground area 42 of soil surface at the surrogate site is above solid ground. The anomalous area 38 is bounded by anomaly borders 46 corresponding to an edge of the subsurface anomaly below ground.

It should be understood that the arrangement of measurement devices, visible phenomena, and subsurface features illustrated in FIG. 1 and described above is merely exemplary. In various other examples, a differing number and arrangement of measurement devices such as probe groups 14, cameras 22, or weather stations 18 of various types are used. In further examples, the measurement devices are used at a surrogate site 10 having different shading and different above surface and below surface features than illustrated in FIG. 1. In yet further examples, a surrogate site 10 has multiple subsurface anomalies, and the subsurface anomalies are of various shapes, sizes, and types.

Figure 2:
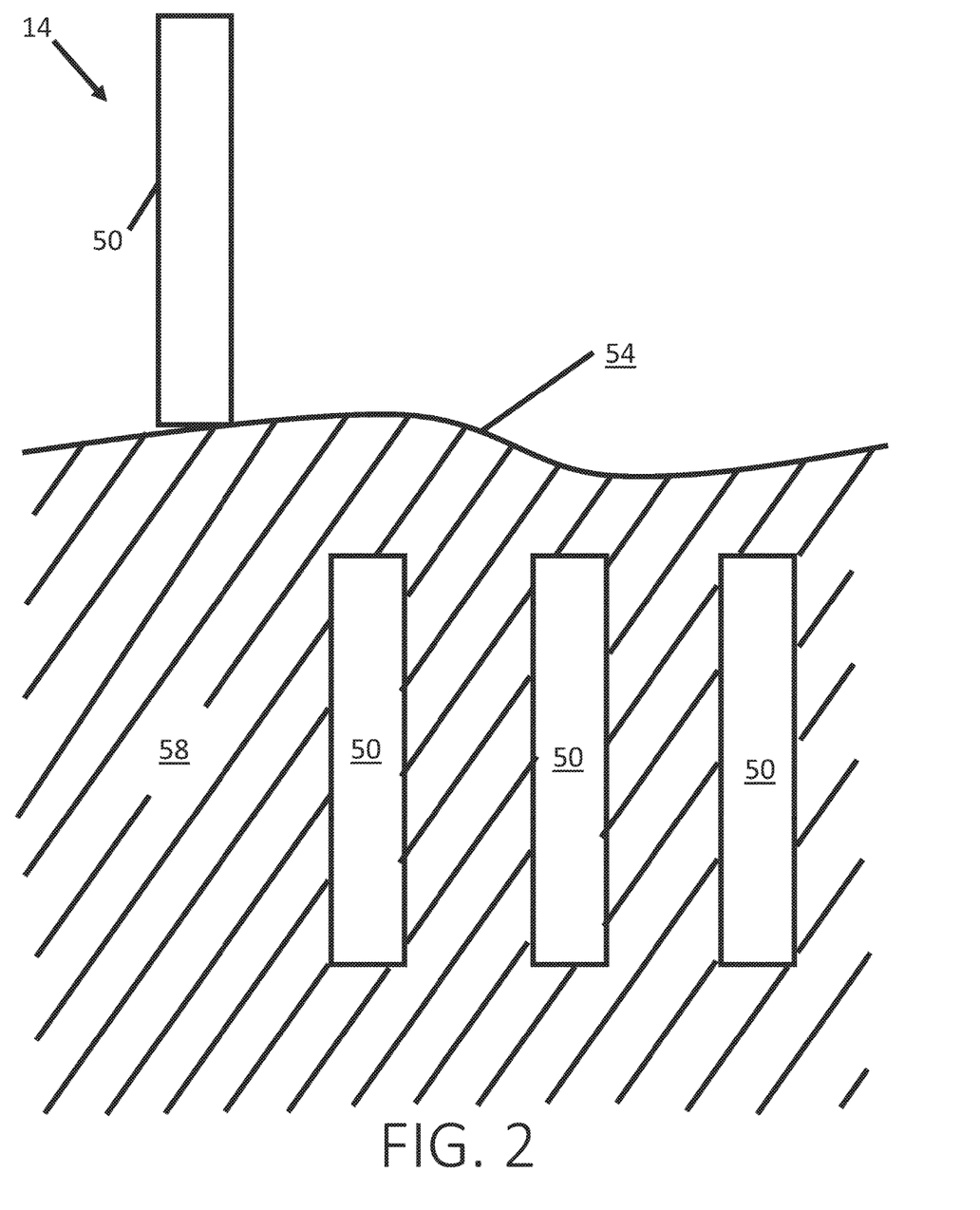
FIG. 2 is a schematic elevation view of a group of thermal probes according to the arrangement.

FIG. 2 shows an arrangement of thermal probes 50 within a probe group 14. Within the group 14, a single probe 50 is positioned above a soil surface 54, possibly with appropriate support structures (not illustrated), and three probes 50 are positioned in soil 58 below the soil surface 54. All probes 50 within the group 14 are positioned close to the soil surface 54. For example, all probes 50 are positioned within one meter of the soil surface 54. The probes 50 beneath the soil surface 54 are positioned at equal or various depths. All probes 50 within the probe group 14 are arranged relative to one another as appropriate for the surrogate site. In various examples, each probe 50 in the group 14 is arranged to effectively measure temperature at a respective point 10 centimeters or less from the soil surface. Similarly, in various arrangements, each probe 50 located above the soil surface 54 is located to measure temperature of air at a point 10 centimeters or less above the soil surface 54, and each probe 50 located below the soil surface 54 is located to measure temperature of soil at a point 10 centimeters or less below the soil surface 54. The illustrated arrangement of probes 50 within the probe group is merely exemplary, and in other examples probe groups 14 include differing total numbers of probes 50, differing numbers of probes 50 above and below the soil surface 54, and arrangements of probes 50 within a group that differ from the arrangement illustrated in FIG. 2. In some examples, probe groups 14 include an equal number of probes above and below the soil surface 54. In various further examples, probe groups 14 in a single surrogate site each have a same number and arrangement of probes 50, or have differing numbers and arrangements of probes 50.

The combined use of probe groups 14, one or more cameras 22, and one or more weather stations 18 at a surrogate site 10 having known subsurface features as generally described above enables the influence of various factors on temperature conditions near the soil surface 54 at the surrogate site 10 to be given quantitative estimates. The temperature conditions tracked in various examples include, mean daily temperatures, temperatures at specific times of day, and rates or magnitudes of temperature change throughout a particular time of day or over a course of multiple days. Such temperature conditions measured by each probe group 14 are compared in view of the factors affecting each probe group to yield the quantitative estimates. For example, differences in magnitudes of temperature change measured by probe groups 14 over a certain period of time are compared between probe groups 14 in a solid ground area 42, in an anomalous area 38, and on or near an anomaly boundary 46. Such a comparison reveals how various subsurface features affect thermal inertia characteristics of a column of soil. The thermal inertia characteristics so derived are useable to identify subsurface features at other sites by observing temperature at the other sites over time and matching the observed temperature changes over time to the thermal inertia characteristics derived for known subsurface features. Such thermal inertia characteristics acquired from comparison of multiple successive surveys enable identification of below surface features of the survey site 70 and removal of noise generated by clutter at the survey site 70.

Further analysis of the results of the comparison in view of the cameras 22 and weather station 18 data reveals how certain above surface factors affect the measurable differences between portions of soil above various subsurface features. Such further analysis enables quantification of, for example, how shade or wind diminishes differences in thermal inertia characteristics between a solid ground area 42 and an anomaly area 38. The quantified effects of the above surface features are useable when interpreting survey data of sites with unknown subsurface features. Further analysis in some examples includes averaging the temperature measurements recorded within a 24 hour period from each probe group 14 to obtain a daily mean temperature at each probe group's 14 location. Differences between daily mean temperatures corresponding to each probe group 14 within a day and between different days is calculated, and those differences are attributed variously to subsurface features below each probe group 14, the amount of time each probe group 14 was shaded, weather conditions such as wind speeds at various times of day, above surface objects near each probe group 14, or interactions between any of the foregoing factors.

Such further analysis also reveals what transient conditions render a survey for unknown subsurface features unproductive. Specifically, the further analysis can identify weather conditions so unfavorable as to warrant rescheduling a live survey. For example, it may be revealed that certain subsurface features tend to be undetectable on days on which wind gusts above a certain speed are detected during a certain time. In a more specific example, it may be revealed that wind gusts above 15 miles per hour occurring between 9 AM and noon on a given day are likely to render subsurface voids 10 meters below the soil surface 54 or deeper undetectable by measurement of temperatures or thermal inertia at the soil surface 54. Wind gusts above 15 miles per hour occurring between 9 AM and noon would therefore be an unfavorable weather condition that warrants rescheduling a planned live survey if the planned live survey is intended to discover subsurface features than 10 meters below the soil surface 54 or deeper. Similar conclusions may be drawn based on other weather events such as daily high or low air temperatures, cloud cover, or precipitation. Generally, calmer and warmer weather conditions are required to discover deeper or smaller subsurface features. Thus, more cloud cover, higher windspeeds, cooler weather, and more precipitation are tolerable when only large or shallow subsurface features are sought. In some examples, a decision of whether to reschedule a live survey takes into account considerations of the depth or size of the subsurface features sought and of the probability of better weather conditions occurring later in the same year.

Figure 3:
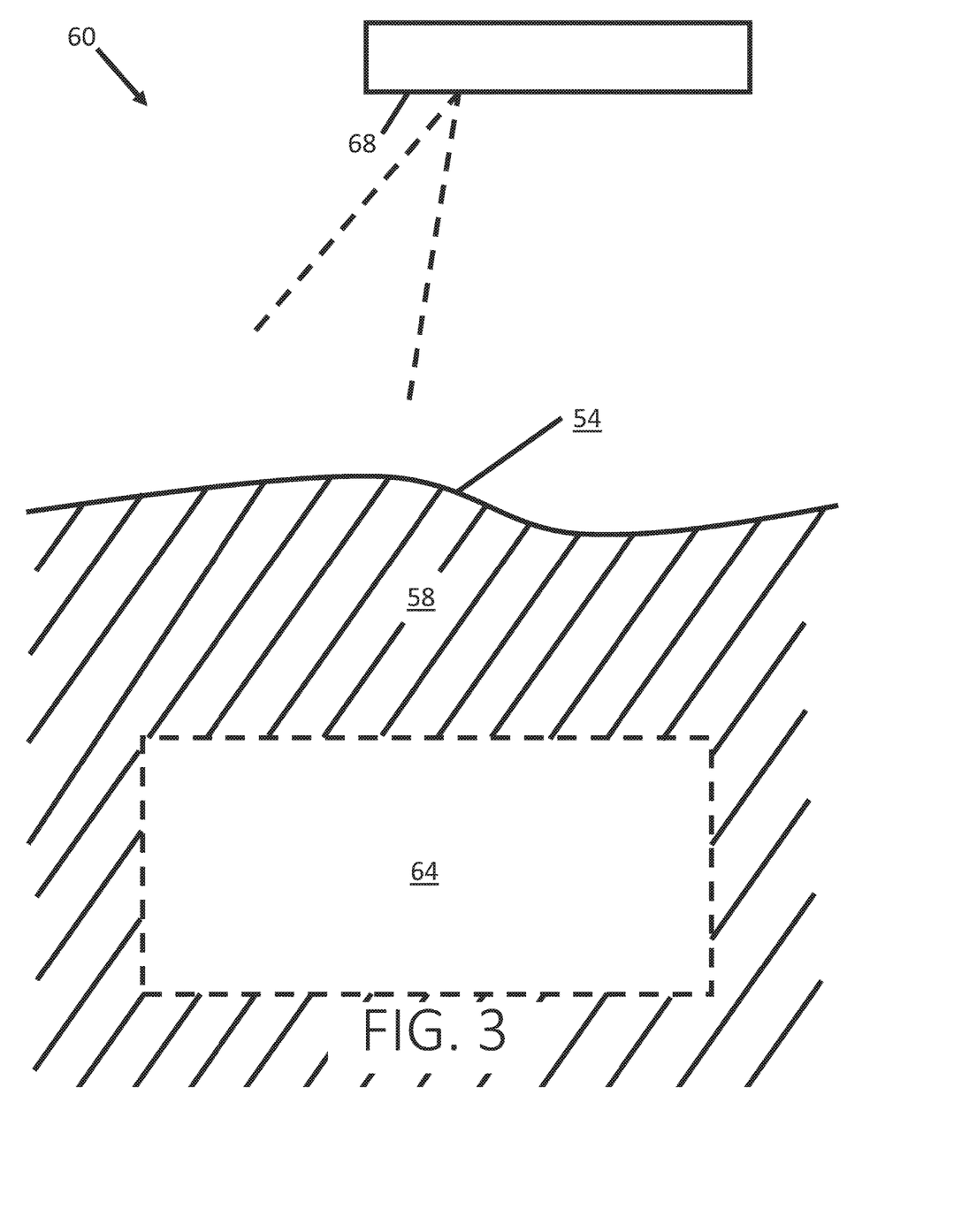
FIG. 3 is a schematic elevation view of a survey process according to the present disclosure.

The foregoing measurements and analyses are used to compile and apply a database for use in connection with live surveys of a survey site 60, as illustrated in FIG. 3. The survey site 60 includes unknown subsurface features or anomalies 64, and a live survey of the survey site 60 includes use of a survey device 68 to collect data from the soil surface 54 of the survey site 60. The survey device 68 is any device equipped with sensors for collecting imageable temperature data from the soil surface 54, such as one or more infrared cameras. In some examples, the infrared camera is a cold filtered infrared camera. In some examples, the survey device 68 is further equipped with an optical camera or any other sensor for gathering data from the survey site 60. Example survey devices 68 include manned or unmanned aerial or terrestrial vehicles including automobiles, drones, and airplanes, handheld devices, or any moveable apparatus positionable to survey an area of land with any of the above described equipment. In further arrangements, the survey device 68 may be one or more thermal probes 50 deposited directly within the survey site 60.

In some arrangements, the live survey includes two or more surveys of the survey site 60 at different times. Measurements taken in each survey may be analyzed consecutively, and the difference between measurements taken in successive surveys may be used to determine the thermal inertia characteristics of specific points throughout the survey site 60. Those thermal inertia characteristics, in view of other observations of the survey site 60 such as the topography, shading, weather, foliage, or any other above ground features, may be compared to the database compiled from measurements previously taken at the surrogate site 10.

Figure 4:
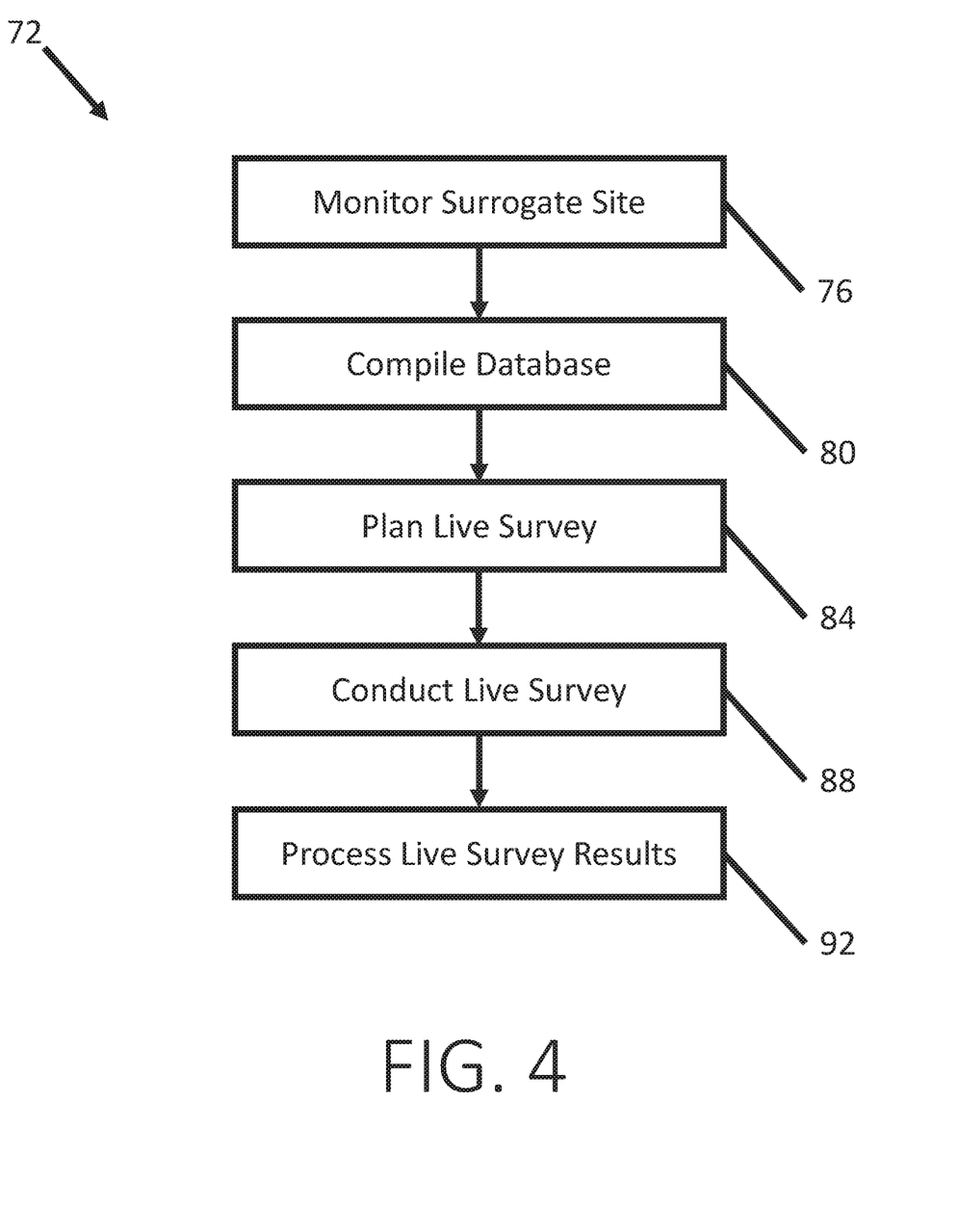
FIG. 4 is a flowchart of an imaging method according to the present disclosure.

FIG. 4 represents a method 72 of imaging unknown subsurface features by application of the above described concepts. A monitoring step 76 includes monitoring a surrogate site 10 as generally set out in FIGS. 1 and 2 and the associated description. A database compiling step 80 includes compiling and analyzing the data from the monitoring step 76. The compiling step 80 involves analysis of how various above and below surface factors interact to affect temperatures measured at a soil surface 54 in the surrogate site.

Particularly, the compiling step 80 includes identifying "signatures" in the soil surface heat change over time data created by the subsurface features of the surrogate site 10. Such signatures are identified by correlating locations and characteristics, such as depth, volume, and type, of the known subsurface features of the surrogate site to differences in temperature change over time measured at particular locations at the soil surface of the surrogate site of varying proximity to the known subsurface feature. For example, if higher daytime peak temperatures and lower night time trough temperatures are measured at a particular soil location that is above a known subsurface anomaly void than at a particular soil location above a column of soil containing no subsurface anomalies, the differences in temperature over time characteristics are a signature created by the known subsurface void. In some arrangements, the characteristics of the known subsurface features are used to determine what signatures would be created by hypothetical subsurface features having slightly differing characteristics. For example, the signature that would be created by a 12 meter deep void may be estimated by extrapolating from known signatures created by a 10 meter deep void and a 15 meter deep void. In yet further arrangements, identification of the signatures includes accounting for the effects of above surface features of the surrogate site, weather conditions, or both, on soil surface temperatures measured at the surrogate site 10. For example, in some arrangements, temperatures measured at particular soil surface locations having varying proximity to an above surface feature are compared to estimate effects of the above surface feature on soil surface temperature at various distances from the above surface feature. In a more specific example, in some arrangements, comparison between temperatures measured at shaded and unshaded locations in the surrogate site 10 is used to estimate how much shade affects soil surface temperatures over time and at various specific times throughout a day. Such estimates of the effect of above surface features are considered in the identification of signatures of subsurface features. With the effects of above surface features accounted for in the identification of the signatures, unknown subsurface features can be detected and described more accurately from survey data acquired at survey sites 60 having different combinations and arrangements of above surface features than the surrogate site 10.

In some arrangements, the estimating or quantification of effects of above surface factors including above surface features such as shade, rocks, foliage, or reflective objects, and weather such as wind or precipitation is achieved by comparing mean measurements from two subsets of the data that show differing degrees of effect by any given above surface factor. For example, in some arrangements, temperature measurements from a first and second probe group 14 are averaged over a period of time to obtain a first mean and a second mean, respectively, wherein the first probe group is shaded, and the second probe group is unshaded, but the two probe groups are otherwise similarly situated. The period of time may be any suitable amount of time, and in specific examples, may be an hour, three hours, or 24 hours, such as from midnight to midnight. The difference between the first and second mean is obtained to provide a quantitative estimate of the effect of shade on soil surface temperature. In other examples, the first and second probe group, or a first and second sensor or sensor group of a different type, differ in proximity to other above surface features such as foliage, reflective surfaces, or local high or low elevation points of the soil surface. The difference between the first and second mean is accordingly a quantitative estimate of the effect of the proximity of the above surface feature whose proximity differentiates the two subsets of data. In another example, infrared radiation measurements of two locations at differing proximity to a reflective object may be averaged over time to provide the first and second mean, and the difference between the first and second mean provides a quantitative estimate of the effect of the proximity of the reflective object on infrared radiation. Similarly, in various additional arrangements, measurements from a single sensor or group of sensors, such as thermal probes or infrared cameras, are averaged on days having different weather conditions to obtain a quantitative estimate of the effect of the weather condition. For example, in some arrangements, measurements from a group of thermal probes are averaged over a period of time on a first day to obtain a first mean, and measurements from the same group of thermal probes may be averaged over the same period of time on a second day. In such arrangements, a difference between the first mean and the second mean provides a quantitative estimate of the effect of any weather condition, such as windspeed, timing of wind gusts, precipitation, that differs between the first day and the second day.

In yet further arrangements, the compiling step includes identification of weather conditions that can obscure signatures of subsurface features during times of day or times of year when those signatures would usually be detectable within soil surface temperature measurements over time. For example, it may be determined that wind gusts above a certain speed at certain times of day will generally obscure the signatures of subsurface anomalies having certain characteristics. In a more specific example, it may be determined that wind gusts above 15 miles per hour before noon on a given day during the monitoring period rendered the signatures of subsurface voids located 10 meters or further below the soil surface at the surrogate site 10 undetectable within the temperature data acquired by the thermal probes 50. The above surface features and weather conditions described in the foregoing examples are for illustrative purposes, and a skilled person would appreciate that the compiling step may be include similar consideration of any observable features and conditions at the selected surrogate site 10, and that various factors such as soil composition and local climate will make the interaction of above surface features, weather conditions, and subsurface feature characteristics on surface temperature data unique to any selected geographic region. Further features or conditions such as, but not limited to, foliage, foliage density, protruding rocks, topography, cloud cover, and precipitation may be considered in the compiling step.

A planning step 84 includes use of the compiled database to determine what times of year and what times of day are likely to have the best conditions for using soil surface 54 temperature data to image unknown subsurface features 64 at a survey site 60 in the same geographic region as the surrogate site 10. In some examples, the planning step 84 includes selection of multiple viable days for conducting a live survey, and in further examples the planning step 84 includes rescheduling a live survey from a preferred viable day to a backup viable day if weather conditions on the preferred viable day are unfavorable. A live survey of the survey site 60 is conducted in a surveying step 88 at a time or times selected in the planning step 84. Finally, results from the surveying step 88 are used to image unknown subsurface features 64 at the survey site 60 in a processing step 92.

In some examples, the processing step 92 includes known imaging methods, such as the DIRECT method described in U.S. Pat. No. 8,787,619, which is hereby incorporated by reference in its entirety. In some examples, an infrared survey in a dual time arrangement includes at least a first pass over the survey site with one or more infrared cameras and a second pass over the survey site with one or more infrared cameras, with the second pass conducted at a later time than the first pass. In various examples, the second pass is conducted with the same infrared wavelength or wavelengths. The processing step 92 further involves use of quantitative estimates of the effects of above surface factors derived in the compiling step 80 to declutter, or otherwise improve, imaging derived from infrared data acquired in the surveying step 88.

In some examples, the effects of shadows or other above ground factors visible in optical images of the survey site 60 are accounted for in generating images from the infrared data acquired in the surveying step 88. In further examples, the accounting includes adjusting for an estimated temperature difference or for reflected infrared radiation attributable to the above ground features within a single survey. In another example, the accounting involves using data acquired from multiple surveys to filter out temperature or infrared anomalies that have thermal inertia profiles inconsistent with subsurface features of interest. In a specific example, in a single set of infrared survey data acquired from an airborne survey device, an above ground feature such as a bush presents an infrared anomaly similar to that of a subsurface void. However, the bush or other above surface feature has differing thermal inertia characteristics than a subsurface void, and therefore exhibits a differing rate of temperature change over time. Successive surveys of the same location therefore reveal which temperature or infrared anomalies have thermal inertia characteristics more consistent with above surface features or clutter than with subsurface voids. Anomalies thereby identified as above surface features could be disregarded or factored into interpretation of other survey data. In various other examples, other above surface sources of clutter including, e.g., shadows, clouds, tracks, stains, disturbed terrain, holes, vegetation or foliage, foreign objects, foreign materials, foreign soils, water, cool air pools and roughness variations, are differentiated from subsurface anomalies by their thermal inertia characteristics as observed from at least two successive surveys.

This additional process of accounting for above ground factors based on interactions identified in the compiling step 80 makes the imaged contours of unknown subsurface features 64 more accurate and enables discovery and imaging of subsurface features 64 disposed further below the soil surface 54 than could be located using infrared imaging alone.

Figure 5:
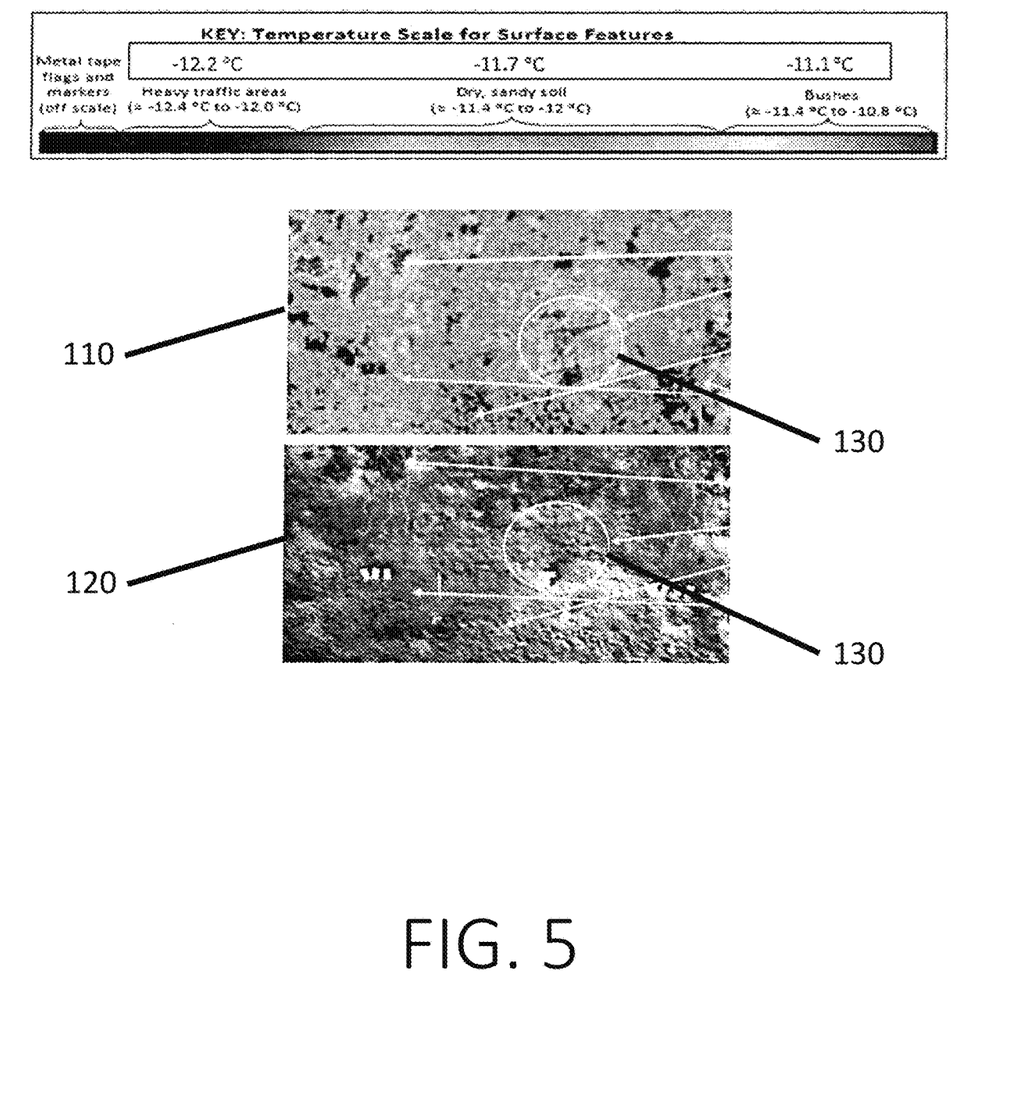
FIG. 5 is a flowchart of an example of an outcome of an imaging method.

FIG. 5 shows a thermal map 110 generally consistent in appearance with a product of the above described infrared survey methods. Underneath thermal map 110 in FIG. 5 is an aerial photo 120 of the same area imaged in thermal map 110. Linear pipe voids and gaps that are not are visible in a circled area 130 of thermal map 110 that are not apparent within circled area 130 in aerial photo 120. Arrows in thermal map 110 and aerial photo 120 point to respective locations of bushes, deep crossed pipe voids, construction gaps, foot traffic, and metal tape markers on cinder blocks. However, aerial photo 120 includes thermal probe wires and a yardstick not visible in thermal map 110. Comparison of thermal map 110 to aerial photo 120 therefore suggests which features may be included or excluded from an image by selecting an image type.

The above methods are described generally with reference to location of below ground anomalies, but other applications are available. For example, similar results may be obtained by application to manmade objects such as bridges, decks, building foundations, or anything else constructed from concrete.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method including:
recording measurements of temperature from thermal probes distributed near a soil surface across a first site throughout a monitoring period, the first site having known subsurface features and the probes being arranged in discrete groups distributed across the first site, each discrete group including at least one probe below the soil surface and at least one probe above the soil surface;
monitoring weather conditions at the first site and video footage of the site throughout the monitoring period;
identifying interactions between above and below soil surface temperatures at particular locations within the first site, the monitored weather conditions, visible above surface features and conditions within the first site, and known subsurface features of the first site to produce a database for discovering unknown subsurface features at a second site by observing weather, above surface features and conditions, and temperature contrasts across multiple soil surface locations at the second site at multiple times of day.

2. The method of claim 1, further including:
recording measurements of lighting and weather conditions occurring at the first site during the monitoring period; and
quantitatively estimating effects of the lighting and weather conditions on temperatures of the soil surface at the particular soil surface locations.

3. The method of claim 1, further including:
estimating effects of above surface features of the first site on temperatures of the soil surface at the particular soil surface locations by comparison of temperatures measured at particular soil surface locations having varying proximity to the above surface features.

4. The method of claim 3, wherein at least one of the above surface features is a shadow.

5. The method of claim 1, wherein the identifying step includes identification of thermal inertia signatures created by the known subsurface features at the soil surface.

6. The method of claim 5, further comprising identifying a threshold wind gust speed, wherein subsurface features having certain characteristics that could otherwise be discoverable by monitoring soil surface level temperature at the second site on a given day will not be discoverable by monitoring soil surface level temperature following the occurrence of a wind gust exceeding the threshold wind gust speed on the given day.

7. The method of claim 6, wherein the certain characteristics include depth.

8. The method of claim 6, further comprising determining a time of day during which a wind gust must exceed the threshold wind gust speed to render subsurface features having the certain characteristics undiscoverable by monitoring soil surface level temperature on the given day.

9. A method of detecting features below a soil surface of a survey site, the method comprising:
compiling a database according to the method of claim 1;
interpreting survey data of the survey site with reference to the database, the survey data being derived from an infrared survey including a first pass and a second pass, the second pass conducted at a later time than the first pass, and the database including measurements of temperature from thermal probes distributed near a soil surface across a surrogate site, the surrogate site having known subsurface features and the measurements of temperature being recorded at regular intervals of less than ten minutes;
wherein the reference to the database includes comparison of the survey data to correlations between temperature changes over time at the particular soil locations within the surrogate site and the known subsurface features of the surrogate site.

10. The method of claim 9, wherein the first pass and the second pass are scheduled by:
selecting a target depth; and
consulting the database to determine times of year and times of day wherein a known subsurface feature of the surrogate site at the target depth creates detectable signatures in temperature change over time at the surrogate site.

11. The method of claim 9, wherein the database includes estimates of effects of at least one type of above surface feature on temperatures measured at the soil surface of the surrogate site, and the interpreting step includes accounting for effects of an above surface features of the same type at the survey site by reference to the estimates.

12. The method of claim 11, wherein the type of above surface feature at the surrogate and survey site is shade.

13. The method of claim 11, wherein the estimates are derived by comparison of temperatures at particular soil locations at the survey site having varying proximity to the above surface feature at the surrogate site.

14. The method of claim 9, wherein the infrared survey includes use of a first infrared camera and a second infrared camera, the first infrared camera configured for shorter wavelengths than the second infrared camera.

15. The method of claim 9, wherein the infrared survey includes use of a cold filtered infrared camera.

16. The method of claim 1, wherein the second site is within the same geographic region as the first site.

17. The method of claim 1, wherein the database includes soil surface level thermal inertia signatures of columns of earth containing manmade anomalies as contrasted to columns of earth free of manmade anomalies.

18. The method of claim 17, wherein the database further includes times of day and times of year wherein thermal inertia contrasts between columns of earth containing manmade anomalies and columns of earth free of manmade anomalies will be most apparent from soil surface level temperature measurements.

19. The method of claim 18, comprising:
identifying, from the database, minimum soil surface level temperature change over time contrasts between columns of earth containing manmade anomalies and columns of earth free of manmade anomalies necessary for the thermal inertia signatures to be detectable from successive surveys of soil surface level temperature at the second site; and
identifying, from the database, wind conditions that would reduce the soil surface level temperature change over time contrasts below the minimum on dates on which the soil surface level temperature change over time contrasts would otherwise meet or exceed the minimum.

* * * * *